Dec. 12, 1967     M. F. NESMITH     3,357,622
WELDING APPARATUS INCLUDING A PNEUMATIC CLAMPING FIXTURE
Filed June 29, 1965     2 Sheets-Sheet 1

Malcolm F. NeSmith,
INVENTOR

BY Harry M. Saragovitz
Edward J. Kelly
Herbert Berl
James P. Deaton

Dec. 12, 1967  M. F. NESMITH  3,357,622
WELDING APPARATUS INCLUDING A PNEUMATIC CLAMPING FIXTURE
Filed June 29, 1965  2 Sheets-Sheet 2

Malcolm F. NeSmith,
INVENTOR.

3,357,622
WELDING APPARATUS INCLUDING A PNEUMATIC CLAMPING FIXTURE
Malcolm F. Nesmith, Wichita, Kans., assignor to the United States of America as represented by the Secretary of the Army
Filed June 29, 1965, Ser. No. 468,172
10 Claims. (Cl. 228—50)

ABSTRACT OF THE DISCLOSURE

A pneumatic clamping fixture in which upper and lower pull down structures are utilized to pull bulkhead sections down into a position relative to a back-up bar for welding of circumferential mating edge surfaces of the bulkhead sections, and intermediate pneumatically actuated clamps that are circumferentially arranged in two spaced apart circles for clamping the bulkhead sections to the back-up bar.

---

Figure 2:
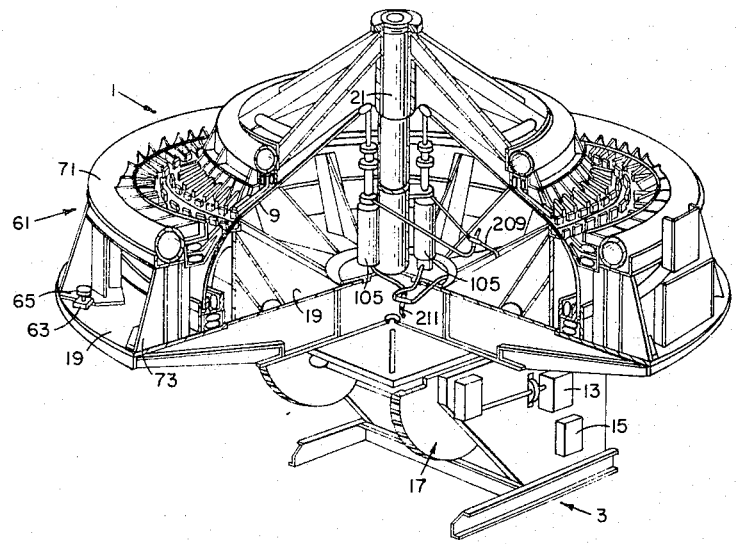

The invention described herein may be manufactured and used by or for the Government for governmental purposes without the payment of any royalty thereon.

This invention relates to a pneumatic clamping fixture for clamping sections of a bulkhead into position where they can be welded together along a circumferential line by tilting the clamping fixture 35° from the vertical and rotating the clamping fixture.

Conventional apparatuses for clamping and welding bulkhead sections together are inadequate in that they require too much time to accomplish an operational cycle, and the clamping mechanism is insufficient to provide a maximum metal-to-metal area contact between the support and sections to be welded together to thereby improve temperature control, necessary to prevent, "burn through," "weld run-out," etc. In summary, a more reliable welding apparatus, and a welding apparatus that is particularly designed for "production line" manufacturing technique is needed in the fabrication of bulkheads for tanks of missiles.

Therefore, it is an object of this invention to provide a welding apparatus that is designed for production line manufacturing technique.

Another object of this invention is to provide a pneumatic clamping fixture that has a plurality of clamping shoes or pressure pads for clamping the metal sections to be welded together to a back-up bar to thereby provide a maximum of metal-to-metal contact between the metal sections and the back-up bar.

Still another object of this invention is to mount the clamping shoes or pressure pads on levers which provide independent mobility of the shoes, and to actuate the levers to and from a clamping position by endless tube or hose means.

A still further object of the invention is to provide an all pneumatic type clamping fixture.

Yet another object of this invention is to provide improved temperature control for the welded joint by providing maximum area contact between the back-up bar and the sections to be welded.

In accordance with this invention, welding apparatus is provided that includes a bulkhead clamping fixture. The clamping fixture has a base to which a center post is mounted. A plurality of clamping cylinder means are mounted to the base and the center post. The base also supports a back-up bar on the same side as the center post. A lower clamping and pull down assembly is mounted on the base for clamping a lower knuckle section of the bulkhead. An upper clamping and pull down assembly is mounted on the center post, and the upper clamping and pull down assembly in conjunction with the clamping cylinder means clamp a cone section relative to the back-up bar and in butting engagement with the lower knuckle section so that the cone section and the knuckle section are clamped in position for welding about a circumferential line.

The base of the clamping fixture is adjustably mounted on a support frame by conventional mechanical movement means so that the clamping fixture can be tilted 35° from the vertical and rotated about an axis concentric with the center post to allow a conventional welding fixture to weld said cone section and knuckle section together about said circumferential line as said clamping fixture is rotated relative to the welding fixture.

Figure 3:
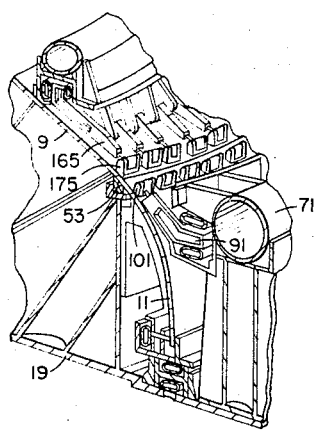
Figure 4:
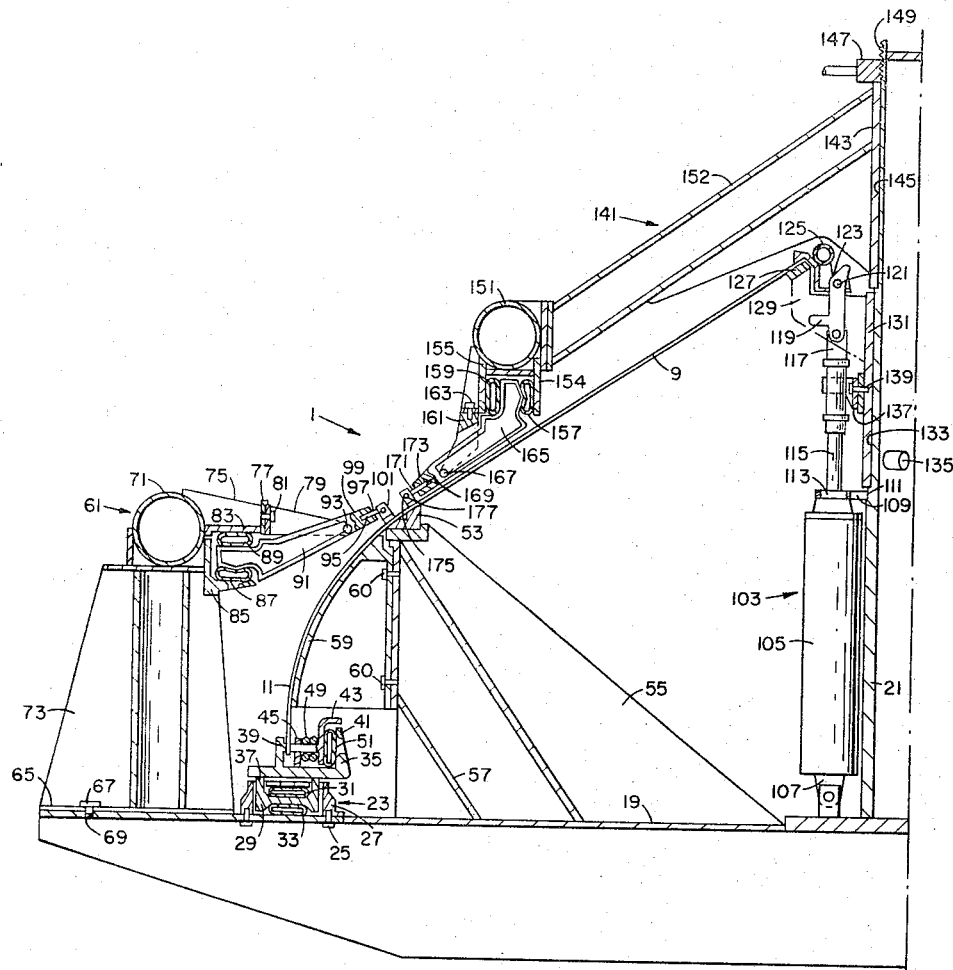
Figure 5:
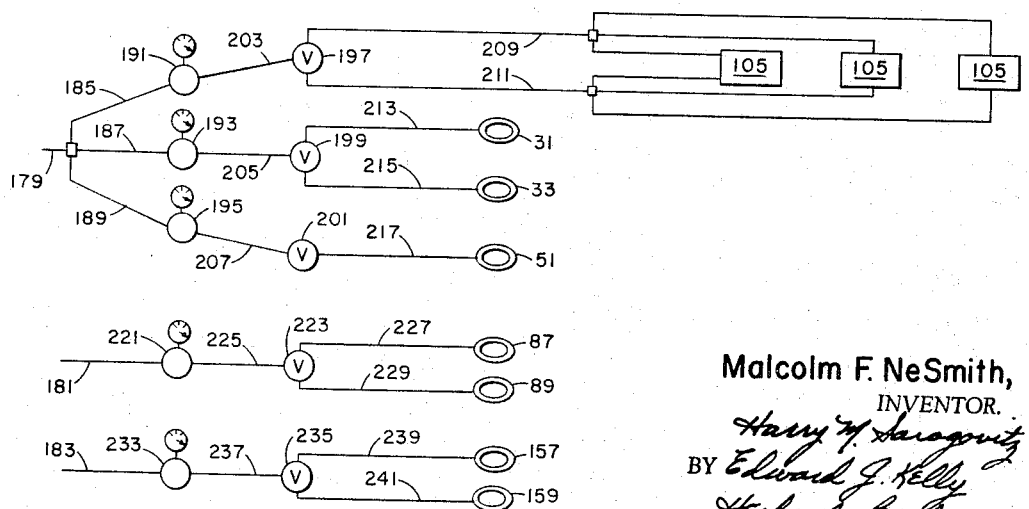

In the accompanying drawing forming a part of this specification, and in which like numerals are employed to designate corresponding parts throughout the same:

FIGURE 7 is an elevational view illustrating a welding apparatus in a welding position, FIGURE 2 is a perspective view partially in section of the clamping fixture and the mounting and adjusting means, FIGURE 3 is a partial sectional view illustrating clamping structure of the clamping fixture, FIGURE 4 is a sectional view illustrating all the clamping elements of the clamping fixture, and FIGURE 5 is a schematic view illustrating a pneumatic control means for the clamping tubes and cylinders.

Figure 1:
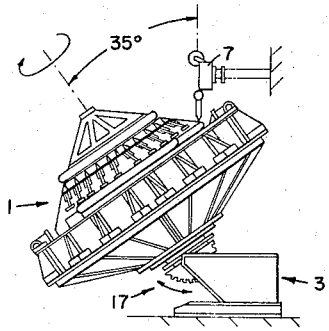

Referring to FIGURE 1, clamping fixture 1 is adjustably mounted on support 3 by adjustable mounting means. When clamping fixture 1 is adjusted to the position illustrated in FIGURE 1 and rotated relative to support 3, a conventional welding fixture 7 is adapted to weld a cone section 9 (see FIGS. 3 or 4) and a knuckle section 11 together.

Referring now to FIGURE 2, the adjustable mounting means includes a reversible motor means 13 that is controlled by control means 15. Motor means 13 is connected in a conventional manner by mechanical gearing means 17 to clamping fixture 1 to tilt clamping fixture 1 and rotate clamping fixture 1 relative to support 3 as illustrated in FIGURE 1.

Clamping fixture 1 has a base 19 (see FIG. 4) to which a center support post 21 is secured in a conventional manner such as by welding. Between the outer periphery of base 19 and center support post 21, a lower clamping and pull down structure 23 is secured to base 19 by bolts 25 (see FIG. 4) which are threaded into ring shaped member 27 which has an inverted U-shape in cross section. Ring shaped member 27 has an inner ring 29 and endless clamp tubes or hoses 31, 33 positioned in the U thereof. A pull-down clamping ring 35 is secured for movement within inner ring 29 by conventional connecting means at 37. Clamping ring 35 has anvil clamping portion 39 and tube or hose support portion 41. A plurality of clamping pressure pads 43 are slidably mounted between anvil portion 39 and support portion 41 by guides 45 that are secured to clamping ring 35 in a conventional manner. Springs 49 are positioned between guides 45 and a portion of each of the clamping pressure pads 43 to bias the clamping pressure pads away from anvil portion 39, and an endless hose or tube 51 is positioned between clamping pressure pads 43 and support portion 41 to actuate the clamping pressure pads toward anvil portion 39.

Back-up bar 53 is supported in position by a plurality of plates 55 and tube supporting means 57, all of which are integrally secured to the back-up bar 53 and base 19 such as by welding. A form support 59 is secured to tube supporting means 57 by bolts 60 to support a major portion of knuckle section 11.

A lower clamping structure 61 for the upper end of knuckle section 11 is removably secured to base 19 by a plurality of clamps 63, only one of which is shown in FIG. 2, which clamp plates 65 of clamping structure 61 to base 19. A plurality of locator pins 67 (see FIG. 4) are mounted in base 19 and project through openings 69 in plates 65 when clamping structure 61 is properly oriented relative to base 19. An endless tube 71 is supported by a plurality of supporting structures 73 that are integrally secured to plates 65 and tube 71. Circular support structure 75 is integrally secured to tube 71 and includes a side member 77 that has a plurality of bracket members 79 secured thereto by bolts 81. Supporting structure 75 also has a base member 83 that defines with L-shaped member 85 a groove which has endless tubes or hoses 87, 89 mounted therein with one end of a plurality of lever arms 91 therebetween. Lever arms 91 are pivotably connected intermediate their ends to bracket members 79 by pins 93 that project through openings in each lever arm and bracket member. The other end of each of lever arms 91 has an opening 95 that receives a finger member 97, and a set screw 99 clamps finger member 97 in opening 95 of each lever arm. A pressure pad 101 is pivotably secured to each finger member 97 to clamp knuckle section 11 to backup bar 53.

An upper pull down structure 103 includes three fluid motors 105 that are each pivotably secured at their lower end 107 to base 19. The upper end of each motor is supported by member 109 that is telescoped over a reduced diameter portion 111 of support post 21 and an upper cylindrical portion 113 of each of the fluid motors. A piston actuated rod 115 projects from each of the fluid motors and is threadedly connected to connector 117. The end of connector 117 remote from piston rod 115 has a pull down link 119 pivotably connected thereto, and link 119 has dowel pin 121 therethrough for reception in notch 123 of pull down ring 125 to pull cone section 9 down into mating engagement with the upper surface of knuckle section 11 and into supporting engagement with upper support ring 127 that is secured in position by support arms 129 that are integral with upper support ring 127 and cylinder 131. Cylinder 131 is telescoped over another reduced diameter portion 133 of support post 21 and secured against rotation relative thereto by a plurality of pins 135 (only one of which is shown). Cylinder 131 is also provided with three guide yokes 137 that are secured thereto by bolts 139 to guide connectors 117.

An upper clamping structure 141 is removaby secured to support post 21 by cylindrical member 143 being telescoped over still another reduced diameter portion 145 of support post 21 and by nut 147 that is threaded onto threads 149 of support post 21. Endless tube 151 is secured to cylindrical member 143 in a conventional manner by a plurality of arms 152 that are integral with cylindrical member 143 and endless tube 151. A pair of inner and outer supports 154 and 155 respectfully are secured to endless tube 151 to provide supporting surfaces for endless hoses or tubes 157 and 159 respectfully. Outer support 155 has a plurality of brackets 161 secured thereto by bolts 163. A lever arm 165 is pivotably secured at 167 to each of brackets 161, with one end of the lever arm being positioned between tubes 157 and 159 to be actuated thereby, and the other end of each lever is provided with a bore 169 that receives finger 171 therein. Set screw 173 secures finger 171 in bore 169. A pressure pad 175 is pivotably secured at 177 to each of fingers 171, and pressure pads 175 are adapted for clamping the lower end of cone section 9 to backup bar 53.

Referring now to FIGURE 5, a pneumatic control means for the clamping fixture includes three inputs 179, 181 and 183 that are supplied with fluid pressure from a conventional source (not shown). Fluid from input 179 is communicated by way of conduits 185, 187 and 189 to pressure regulators 191, 193 and 195 respectfully. Regulated fluid pressure from the outlets of pressure regulators 191, 193 and 195 are communicated with supply and exhaust control valves 197, 199 and 201 respectfully by conduits 203, 205 and 207 respectfully.

Supply and exhaust control valve 197 is in fluid communication with the tops of fluid motor means 105 for supplying and exhausting fluid from the tops of fluid motor means 105 by conduit means 209, and control valve 197 is also in fluid communication with the bottoms of fluid motor means 105 by conduit means 211. Control valve 197 is so designed that when fluid is communicated to the tops of fluid motor means 105, the bottoms are exhausted to atmosphere and vice versa.

Supply and exhaust control valve 199 is in fluid communication with endless hoses 31 and 33 by conduits 213 and 215 respectfully for alternately supplying fluid to one of hoses 31, 33 and exhausting fluid from the other and vice versa.

Supply and exhaust control valve 201 is in fluid communication with endless hose 51 by conduit 217 for supplying fluids to and exhausting fluid from endless hose 51 as desired.

Fluid from input 181 is communicated to pressure regulator 221. Regulated fluid pressure from regulator 221 is communicated to supply and exhaust control valve 223 by conduit 225, and supply and exhaust control valve 223 is in fluid communication with endless hoses 87 and 89 by conduits 227 and 229 respectfuly for alternately supplying fluid to one of hoses 87, 89 and exhausting fluid from the other and vice versa.

Fluid from input 183 is supplied to pressure regulator 223. Regulated fluid pressure from regulator 233 is communicated to supply and exhaust control valve 235 by conduit 237, and supply and exhaust control valve 235 is in fluid communication with endles hoses 157 and 159 by conduits 239 and 241 respectfully for alternately supplying fluid to one of hoses 157, 159 and exhausting fluid from the other and vice versa.

In the operation of clamping and welding a bulkhead, clamping fixture 1 is adjusted to a horizontal position. With lower clamping structure 61 and upper clamping structure 141 removed, knuckle section 11 is positioned on the clamping fixture with the lower end of knuckle section 11 being received between anvil portion 39 and pressure pads 43. Hose 51 is pressurized by the appropriate actuation of valve 201 to clamp the lower end of knuckle section 11 between anvil portion 39 and pressure pads 43. Valve 199 is next actuated to provide pressurizing fluid in hose 31 to pull knuckle section 11 down into position relative to backup bar 53. Lower clamping structure 61 is then positioned on and secured to base 19, and hose 87 is pressurized by the appropriate actuation of valve 223 to actuate lever arms 91 and in turn pressure pads 101 to clamp the upper end of knuckle section 11 relative to back-up bar 53.

Cone section 9 is then placed on the fixture, and pull down ring 125 is placed in the upper end of cone section 9. Dowel pins 121 are positioned in notches 123, and fluid motors 105 are pressurized to pull the cone section down into position by the appropriate actuation of control valve 197.

Upper clamping structure 141 is next positioned on support post 21 and secured thereto by tightening nut 147. Pressurizing fluid is supplied to hose 157 by the appropriate actuation of control valve 235 to actuate lever arms 165 and in turn pressure pads 175 to clamp the lower end of cone section 9 relative to back-up bar 53.

With the knuckle section 11 and cone section 9 clamped in position, the clamping fixture is then tilted 35° relative to the vertical by motor means 13. The clamping fixture is then rotated by motor means 13 about an axis which is along the axis of support post 21, and welding fixture 7 welds knuckle section 11 and cone section 9 together at their abutting surfaces.

After knuckle section 11 and cone section 9 have been welded together to form a bulkhead, the clamping fixture is actuated back to the vertical position by motor means 13, and upper clamping structure 141 and lower clamping structure 61 are removed to allow the bulkhead to be removed.

It is to be understood that the form of my invention, herewith shown and described, is to be taken as a preferred example of the same, and that various changes in the size, shape and arrangement of parts may be resorted to, without departing from the spirit of my invention, or the scope of the subjoined claims.

I claim:

1. A clamping fixture for clamping bulkhead sections in position to be welded together including: a base; a lower pull down structure; a back-up bar; and an upper pull down structure mounted on said base in the above claimed sequence; said lower pull down structure mounted on said base for pulling down the lower end of a knuckle section, said back-up bar mounted on said base above said lower pull down structure, a lower clamping structure mounted on said base and disposed for clamping relative to a lower portion of said back-up bar; said upper pull down structure mounted relative to said base for pulling a cone section down into position, and an upped clamping structure mounted relative to said base and disposed for clamping relative to an upper portion of said back-up bar.

2. A clamping figure as set forth in claim 1, wherein said upper and lower clamping structures each include a plurality of pivotably mounted lever arms that are actuated into clamping position by an endless hose so as to exert an equal force on each of said lever arms.

3. A clamping fixture as set forth in claim 2, wherein said upper and lower clamping structures are removably mounted relative to said base.

4. A clamping fixture as set forth in claim 1, wherein said upper pull down structure includes fluid motor means for actuating said upper pull down structure.

5. A clamping fixture as set forth in claim 1, wherein said lower pull down structure includes means that is actuated by an endless hose to clamp the lower end of the knuckle section and another means that is secured to said last mentioned means and actuated by an endless hose to pull the knuckle section down.

6. A clamping fixture as set forth in claim 1, wherein said base is adjustably mounted on a support by adjustable mounting means for tilting and rotating said base relative to said support, and said adjustable mounting means including reversible motor means for actuating said adjustable mounting means to tilt said base relative to said support and rotate said base relative to said support.

7. A clamping fixture as set forth in claim 1, wherein said upper and lower pull down structures and said upper and lower clamping structures are actuated by pneumatic means.

8. In a clamping fixture for clamping bulkhead sections in position to be welded together, said clamping fixture including a plurality of pressure pads arranged in a circular pattern, an endless tube mounted relative to said pressure pads, and means interconnecting said endless tube with said pressure pads so that when said endless tube is pressurized said endless tube will actuate said pressure pads toward a clamping position and apply an equal amount of clamping force to each of said pressure pads.

9. In a clamping fixture for clamping bulkhead sections as set forth in claim 8, wherein said interconnecting means includes pivotably mounted lever arms.

10. In a clamping fixture for clamping bulkhead sections as set forth in claim 9, wherein a second endless tube is mounted in opposition to said first mentioned endless tube with a portion of each of said lever arms being positioned between said first mentioned endless tube and said second endless tube to adapt said second endless tube for actuating said pressure pads away from said clamping position when said second endless tube is pressurized.

References Cited

UNITED STATES PATENTS 3,131,663    5/1964    Lawson _____ 228—50
3,275,794    9/1966    Dubusker et al. _____ 228—50

RICHARD H. EANES, Jr., *Primary Examiner.*

JOHN F. CAMPBELL, *Examiner.*

M. L. FAIGUS, *Assistant Examiner.*